(12) United States Patent
Shibata et al.

(10) Patent No.: US 10,953,736 B2
(45) Date of Patent: Mar. 23, 2021

(54) GLASS RUN AND METHOD OF MANUFACTURING THE SAME

(71) Applicant: TOYODA GOSEI CO., LTD., Kiyosu (JP)

(72) Inventors: Taizo Shibata, Kiyosu (JP); Naoto Nakanishi, Kiyosu (JP); Tomohiro Kudo, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 129 days.

(21) Appl. No.: 16/134,074

(22) Filed: Sep. 18, 2018

(65) Prior Publication Data

US 2019/0092153 A1 Mar. 28, 2019

(30) Foreign Application Priority Data

Sep. 27, 2017 (JP) .............................. JP2017-185589

(51) Int. Cl.

| | |
|---|---|
| *B60J 10/76* | (2016.01) |
| *B60J 10/277* | (2016.01) |
| *B60J 1/00* | (2006.01) |
| *E05D 15/16* | (2006.01) |
| *B60J 10/235* | (2016.01) |
| *B60J 10/21* | (2016.01) |

(52) U.S. Cl.
CPC .............. *B60J 10/76* (2016.02); *B60J 1/007* (2013.01); *B60J 10/21* (2016.02); *B60J 10/235* (2016.02); *B60J 10/277* (2016.02); *E05D 15/165* (2013.01)

(58) Field of Classification Search
CPC ........................................................ B60J 10/76
See application file for complete search history.

(56) References Cited

U.S. PATENT DOCUMENTS

| | | | |
|---|---|---|---|
| 5,636,895 A | 6/1997 | Ito et al. | |
| 6,440,492 B1 * | 8/2002 | Coran | .................. C08J 7/0427 |
| | | | 427/195 |

(Continued)

FOREIGN PATENT DOCUMENTS

| | | |
|---|---|---|
| JP | H06-135240 A | 5/1994 |
| JP | 2000-025461 A | 1/2000 |

(Continued)

OTHER PUBLICATIONS

Office Action dated Jul. 21, 2020 issued in corresponding JP patent application No. 2017-185589 (and English translation).

*Primary Examiner* — Catherine A Kelly

(74) *Attorney, Agent, or Firm* — Posz Law Group, PLC

(57) ABSTRACT

A glass run includes: an extrusion molding part disposed along an upper side part of a vehicle door; a molded part connected and molded to the extrusion molding part, the molded part being disposed in a predetermined corner part and the vicinity of the corner part; a protruding piece part provided in a predetermined longitudinal section extending across a connecting part between the extrusion molding part and the molded part, the protruding piece part protruding from an upper surface of a base part and being provided integrally with the molded part; and a concave part provided from an upper surface of the protruding piece part to the upper surface of the base part, a bottom part of the concave part being a predetermined area of the upper surface of the base part including a part of the connecting part.

6 Claims, 8 Drawing Sheets

(56) References Cited

U.S. PATENT DOCUMENTS

| | | | | |
|---|---|---|---|---|
| 6,647,666 B2* | 11/2003 | Kawai | ............ | B60J 10/22 |
| | | | | 49/479.1 |
| 6,708,450 B2* | 3/2004 | Tanaka | ............ | B60J 10/17 |
| | | | | 49/441 |
| 6,964,133 B2* | 11/2005 | Aritake | ............ | B29C 45/14467 |
| | | | | 49/441 |
| 7,294,386 B2* | 11/2007 | Murase | ............ | B60R 21/205 |
| | | | | 428/120 |
| 7,533,495 B2* | 5/2009 | Teramoto | ............ | B60J 10/30 |
| | | | | 49/441 |
| 7,762,614 B2* | 7/2010 | Kubo | ............ | B29C 66/543 |
| | | | | 296/146.2 |
| 9,079,481 B2* | 7/2015 | Nameki | ............ | B29C 48/12 |
| 9,415,671 B2* | 8/2016 | Sentani | ............ | B60J 10/235 |
| 9,649,921 B2* | 5/2017 | Bessho | ............ | B60J 5/0402 |
| 9,956,858 B2* | 5/2018 | Sobue | ............ | B60J 10/36 |
| 10,569,629 B2* | 2/2020 | Kameoka | ............ | B60J 10/26 |
| 2002/0001696 A1* | 1/2002 | Kozawa | ............ | B29C 45/14409 |
| | | | | 428/156 |
| 2005/0053761 A1* | 3/2005 | Murase | ............ | B60R 21/233 |
| | | | | 428/122 |
| 2009/0064592 A1* | 3/2009 | Takase | ............ | B60J 10/277 |
| | | | | 49/374 |
| 2013/0111821 A1* | 5/2013 | Suzuki | ............ | B60J 10/78 |
| | | | | 49/483.1 |
| 2018/0339582 A1* | 11/2018 | Taketomo | ............ | B60J 10/76 |
| 2019/0217693 A1* | 7/2019 | Krefta | ............ | B60J 5/0402 |

FOREIGN PATENT DOCUMENTS

| | | |
|---|---|---|
| JP | 2009-090897 A | 4/2009 |
| JP | 2014-193634 A | 10/2014 |

* cited by examiner

GLASS RUN AND METHOD OF MANUFACTURING THE SAME

CROSS-REFERENCE TO RELATED APPLICATION(S)

This application is based upon and claims the benefit of priority from Japanese Patent Application No. 2017-185589, filed on Sep. 27, 2017, the entire contents of which are incorporated herein by reference.

BACKGROUND

1. Field of the Invention

The present invention relates to a glass run to be mounted on a vehicle door and a method of manufacturing the same.

2. Description of the Related Art

A door of a vehicle such as an automobile is provided with a door glass for opening and closing a window opening portion to be movable up and down, and a glass run for sealing the circumferential edge of the door glass is mounted along a sash or the like of a door frame surrounding the window opening portion.

In general, the glass run includes an upper side part provided corresponding to an upper edge part of the door glass, and a front longitudinal side part and a rear longitudinal side part respectively provided corresponding to the longitudinal edge parts on the front and rear sides of the door glass, and the glass run is constituted by an extrusion molding part in which these elements are formed substantially linearly and a molded part for connecting end portions of the extrusion molding part.

The extrusion molding part is linearly extrusion-molded by a predetermined extruder. Incidentally, the molded part is molded by a predetermined mold device so that the two extrusion molding parts are connected to each other at a predetermined angle.

When viewed from a cross section orthogonal to the longitudinal direction of the glass run, the glass run includes a main body part having a substantially U-shaped cross section and including a base part and a pair of sidewall parts extending from the base part, and a pair of seal lips extending from the substantially front ends of both sidewall parts of the main body part to the inside of the main body part and sealing the vehicle inside and the vehicle outside of the door glass.

In the related art, regarding the upper side part of the glass run, there are various problems such as an occurrence of collision noise due to the door glass hitting the base part of the glass run when the door glass rises and the window opening portion is closed.

On the other hand, in recent years, in order to mitigate the impact when the door glass is brought into contact with the base part of the glass run and to prevent the occurrence of collision noise and the like, glass runs in which a thick portion is formed at the base part of the upper side part of the molded part constituting a part of the upper side part of the glass run are also seen (for example, see JP-A-2000-25461).

However, as described in JP-A-2000-25461, in the upper side part of the glass run, when the thick portion is formed only in the molded part and a difference in wall thickness occurs between the extrusion molding part and the molded part, co-called interface cracking or the like may occur in which the extrusion molding part and the molded part are separated at the connecting part due to the load at the time of contacting or the like with the door glass.

In addition, when the door glass is brought into contact with the glass run, the glass run main body part and, further, the seal lip or the like may be deformed unevenly in the vicinity of the connecting part, and the sealing property may deteriorate.

SUMMARY

The present invention has been made in view of the above circumstances, and an object thereof is to provide a glass run capable of preventing an occurrence of problems such as interface cracking at a connecting part between an extrusion molding part and a molded part, and a method of manufacturing the same.

According to a first aspect of the present invention, there is provided a glass run including: a main body part mounted to a vehicle door including a door glass that ascends and descends, the main body part having a substantially U-shaped cross section and including: a base part; and a vehicle inside sidewall part and a vehicle outside sidewall part extending from both ends of the base part; a pair of seal lips extending from the vehicle outside sidewall part and the vehicle inside sidewall part to an inside of the main body part, the pair of seal lips being configured to have sealability between the pair of seal lips and the door glass; an extrusion molding part disposed along an upper side part of the vehicle door; a molded part connected and molded to the extrusion molding part by continuously die molding, the molded part being disposed in a predetermined corner part, in which the upper side part and a vertical side part of the vehicle door intersect with each other, and the vicinity of the corner part; a protruding piece part provided in a predetermined longitudinal section extending across a connecting part between the extrusion molding part and the molded part, the protruding piece part protruding from an upper surface of the base part and being provided integrally with the molded part; and a concave part provided from an upper surface of the protruding piece part to the upper surface of the base part, a bottom part of the concave part being a predetermined area of the upper surface of the base part including a part of the connecting part.

According to the first aspect, the glass run includes the protruding piece part on the upper side part, and thus it is possible to mitigate the impact at the time of contact with the door glass and to prevent various problems, such as an occurrence of collision noise, interface cracking at the connecting part, and deterioration in sealing property.

However, in the case of forming the protruding piece part, since sink marks may be generated at the time of molding, it is preferable to provide the concave part in the protruding piece part.

However, with such a configuration, in the case where a general portion (a portion where a concave part is not formed) of the protruding piece part is formed to be superimposed on the connecting part between the extrusion molding part and the molded part, when the extrusion molded part is set in the mold device for performing die molding, the concave molded part of the mold corresponding to the general part of the protruding piece part faces the end portion of the extrusion molded part in the cavity. That is, a part of the end portion of the extrusion molding part is not pressed by the mold.

In such a case, due to the pressure of the material injected into the cavity, there is a risk of connection failure, for example, due to the fact that the end of the extrusion molding part is pushed by the pressure of the material injected into the cavity, a part of the end portion (connecting part) of the extrusion molding part is distorted, curled up etc.

Further, when the convex molded part of the mold corresponding to the concave part of the protruding piece part is located on the upstream side of the end portion of the extrusion molded part in the cavity, since it is difficult for the material to wrap around the end portion side of the extrusion molding part and filling of the material tends to be insufficient, even in such a case, connection failure may occur. As a result, there is a possibility of occurring the interface cracking or the like due to the connection failure.

In this regard, according to the aspect, the predetermined area of the upper surface of the base part including a part of the connecting part is provided with a concave part serving as the bottom part. In other words, when the extrusion molding part is set in the mold device for die molding, the convex molded part of the mold corresponding to the concave part of the protruding piece part presses the end portion of the extrusion molding part in the cavity. As a result, it is possible to prevent the occurrence of connection failure, and further an occurrence of interface cracking and the like due to connection failure.

According to a second aspect of the present invention, in the glass run according to the first aspect, the concave part may be surrounded by a circumferential wall part continuous in a circumferential direction in a cross section substantially parallel to the base part.

According to the second aspect, the rigidity of the protruding piece part can be prevented from deteriorating, and continuity in the longitudinal direction of the protruding piece part can be secured.

As a result, it is possible to mitigate the impact at the time of contact with the door glass, and it is possible to further enhance the operational effect of the first aspect which prevents various problems such as occurrence of collision noise, interface cracking at the connecting part, deterioration of sealing property, and the like.

According to a third aspect of the present invention, in the glass run according to the first aspect or the second aspect, an upper part of the concave part may be inclined toward the corner part side of the molded part.

According to the third aspect, when contacting with the door glass, the partition wall part (the wall part adjacent to the concave part with respect to the longitudinal direction of the protruding piece part) of the protruding piece part is easily bent.

As a result, it is possible to mitigate the impact at the time of contact with the door glass, and it is possible to further enhance the operational effect of the first aspect which prevents various problems such as occurrence of collision noise, interface cracking at the connecting part, deterioration of sealing property, and the like.

Also, regarding the convex molded part of the mold corresponding to the concave part of the protruding piece part, since the convex molded part is also inclined with respect to the flow path direction of the die molding material flowing through the cavity corresponding to the base part, at the time of the die molding, the concave molded part of the mold corresponding to the partition wall part of the protruding piece part is easily filled with the die molding material.

Normally, at the time of die molding, it is configured so that the material flows from the corner part side of the molded part toward the extrusion molding part side (connecting part side). Therefore, with the above-described configuration, the die molding material flowing from the cavity corresponding to the base part into the concave molded part corresponding to the partition wall part of the protruding piece part is first moved along the upstream side inclined wall surface of the concave molded part corresponding to the partition wall part, while filling into the back side of the concave molded part along the upstream side inclined wall surface of the concave molded part corresponding to the partition wall part, and also flows into the back side of the concave molded part corresponding to the sidewall part (the wall part adjacent to the concave part with respect to the width direction of the protruding piece part) or the like to fill thereinto. Subsequently, as the die molding material fills into the concave molded part corresponding to the partition wall part, the die molding material passes along the downstream side inclined wall surface of the concave molded part corresponding to the partition wall part and follows a path so as to return to the cavity side corresponding to the base part while filling into the concave molded part corresponding to the sidewall part or the like. Incidentally, the die molding material flowing into the concave molded part corresponding to the sidewall part and the like flows into the back side of the concave molded part corresponding to the partition wall part on the downstream side so as to go around the convex molded part corresponding to the concave part and is filled thereinto. Therefore, it is difficult for air or the like to remain on the back side of the concave molded part, and molding failure is less likely to occur.

According to a fourth aspect of the present invention, in the glass run according to any one of the first to third aspects, in the cross section substantially parallel to the base part, the concave part may have a substantially rectangular cross section surrounded by two sides substantially parallel to a longitudinal direction of the protruding piece part and two sides substantially parallel to a width direction of the protruding piece part.

According to the fourth aspect, when contacting with the door glass, the protruding piece part is unlikely to be bent unevenly. As a result, it is possible to mitigate the impact at the time of contact with the door glass, and it is possible to further enhance the operational effect of the first aspect which prevents various problems such as an occurrence of collision noise, interface cracking at the connecting part, deterioration of sealing property, and the like.

Even when the position of the end portion (connecting part) of the extrusion molding part is deviated in the longitudinal direction due to the pressure of the material injected into the cavity during die molding, it is possible to keep the pressing width of the end portion of the extrusion molding part constant in the width direction of the protruding piece part.

According to a fifth aspect of the present invention, there is provided a method of manufacturing a glass run, the glass run including: a main body part mounted to a vehicle door including a door glass that ascends and descends, the main body part having a substantially U-shaped cross section and including a base part and a vehicle inside sidewall part and a vehicle outside sidewall part extending from both ends of the base part; a pair of seal lips extending from the vehicle outside sidewall part and the vehicle inside sidewall part to an inside of the main body part, the pair of seal lips being configured to have sealability between the pair of seal lips and the door glass; an extrusion molding part disposed along an upper side part of the vehicle door; a molded part connected and molded to the extrusion molding part by continuously die molding, the molded part being disposed in a predetermined corner part, in which the upper side part and a vertical side part of the vehicle door intersect with each other, and the vicinity of the corner part; a protruding piece part provided in a predetermined longitudinal section extending across a connecting part between the extrusion molding part and the molded part, the protruding piece part protruding from an upper surface of the base part and being provided integrally with the molded part; and a concave part provided from an upper surface of the protruding piece part to the upper surface of the base part, the method including: extrusion-molding the extrusion molding part by an extrusion molding method; setting the extrusion molding part in a predetermined mold device; and connecting and molding the molded part to an end portion of the extrusion molding part by filling a cavity of the mold device with a die molding material in a state which the extrusion molding part is set in the mold device, wherein when the extrusion molding part is set in the mold device, a predetermined convex molded part of the mold device corresponding to the concave pail of the protruding piece part in the cavity is in a state of pressing the end portion of the extrusion molding part.

According to the fifth aspect, the same operational effects as those of the operational effects in the manufacturing described in the first aspect are achieved.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
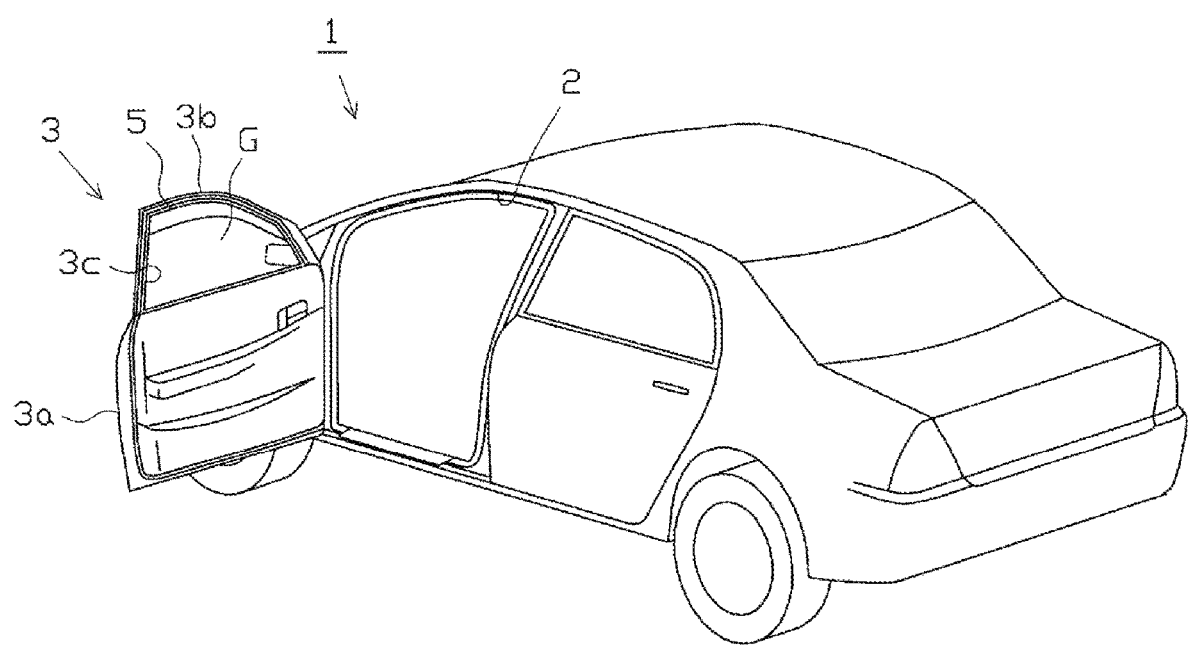
FIG. 1 is a perspective view illustrating an automobile.

Hereinafter, an embodiment will be described with reference to the drawings. As illustrated in FIG. 1, a front door 3 (hereinafter, simply referred to as "door 3") as a vehicle door is provided in a door opening portion 2 of an automobile 1 so as to be openable and closable.

The door 3 includes a door main body 3a, a door frame 3b provided in a frame shape above the door main body 3a, a window opening portion 3c provided so as to be surrounded by the upper edge part of the door main body 3a and the door frame 3b, a door glass G for opening and closing the window opening portion 3c, and a glass run 5 for guiding the lifting and lowering of the door glass G and sealing between the periphery of the door glass G and the door frame 3b.

The glass run 5 is mounted along the sash part S (see FIG. 3) provided on the inner circumferential side (the window opening portion 3c side) of the door frame 3b and a channel part (not shown) provided in the door main body 3a so as to extend the longitudinal side portions in front of and behind the sash part S downward.

When viewed in the longitudinal direction, the glass run 5 has an upper side part corresponding to the upper edge part of the door glass G and mounted to the sash part S of the upper side part of the door frame 3b, a front longitudinal edge part corresponding to the front longitudinal side part of the door glass G and mounted to the sash part S of the front longitudinal side part of the door frame 3b and the channel part following this, and a rear longitudinal edge part corresponding to the rear longitudinal side part of the sash part S of the rear longitudinal side part of the door frame 3b and mounted to the sash part S of the rear longitudinal edge part of the door frame 3 and the channel part following this. An extrusion molding part in which these are formed in a substantially linear shape, and a molded part for connecting the end portions of the extrusion molding part at a predetermined angle are configured.

Figure 2:
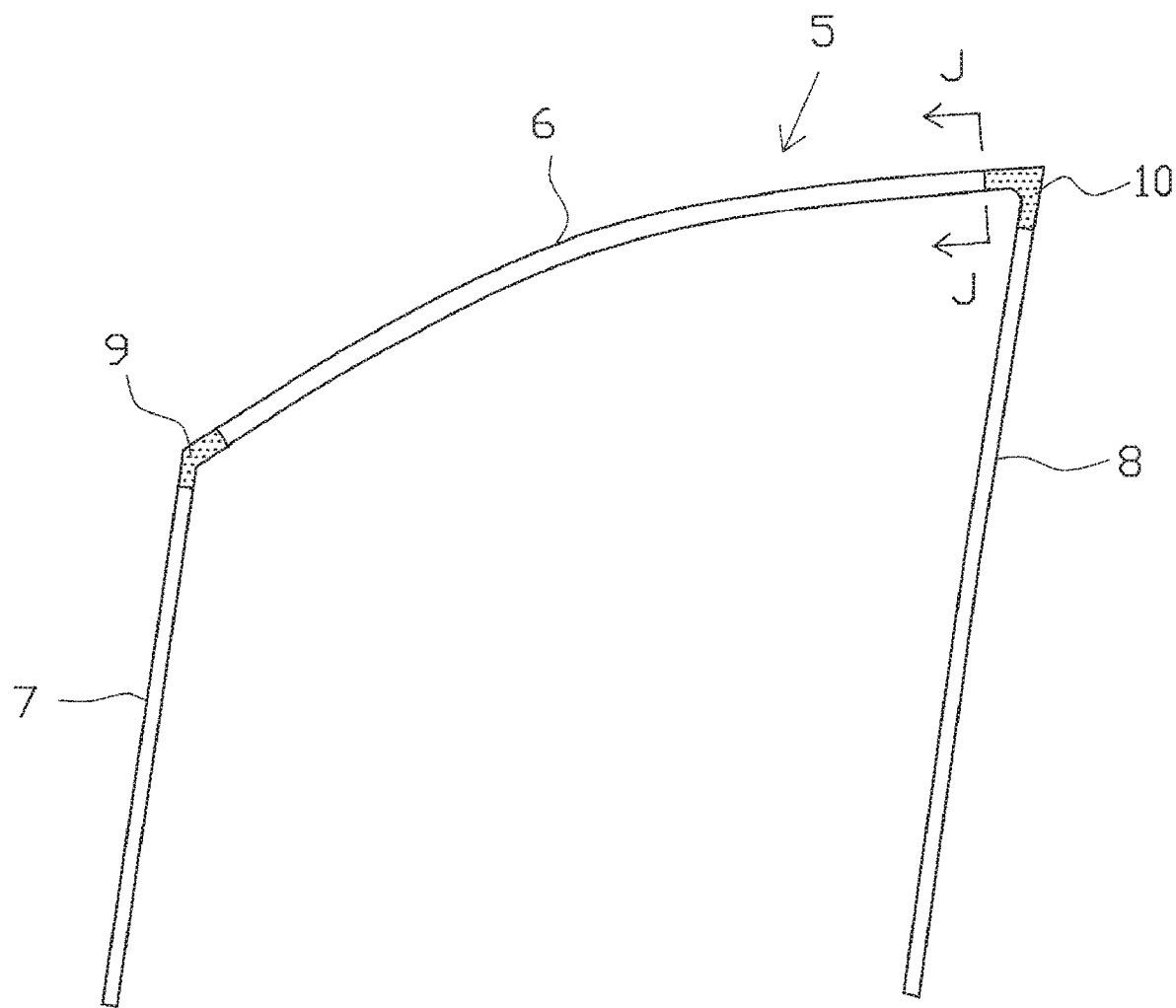
FIG. 2 is a front view illustrating a glass run.

More specifically, as illustrated in FIG. 2, the glass run 5 includes an upper extrusion molding part 6 provided corresponding to the upper edge part of the door glass G, a front extrusion molding part 7 corresponding to the front longitudinal edge part of the door glass G, a rear extrusion molding part 8 provided corresponding to the rear longitudinal edge part of the door glass G, a front upper corner molded part 9 which connects the end portions of the upper extrusion molding part 6 and the front extrusion molding part 7 and is provided from the upper side part to the front longitudinal side part, and an upper corner molded part 10 which connects the end portions of the upper extrusion molding part 6 and the rear extrusion molding part 8 and is provided from the upper side part to the rear longitudinal side part. In FIG. 2, for the sake of convenience, portions corresponding to the molded parts 9 and 10 are indicated with scattering patterns.

Each of the extrusion molding parts 6 to 8 is formed in a substantially linear shape by an extruder (not illustrated). On the other hand, the molded parts 9 and 10 are connected by a mold device 50 (to be described later) so that the two extrusion molding parts 6 and 7 or the extrusion molding parts 6 and 8 are connected to each other at a predetermined angle Here, the front upper corner molded part 9 is formed in an obtuse angle corresponding to the front upper corner part of the door glass G, and the rear upper corner molded part 10 is formed in an acute angle corresponding to the rear upper corner part of the door glass G.

In this embodiment, the extrusion molding parts 6 to 8 and the molded parts 9 and 10 are made of the same material as EPDM (ethylene-propylene-diene copolymer) rubber.

Figure 3:
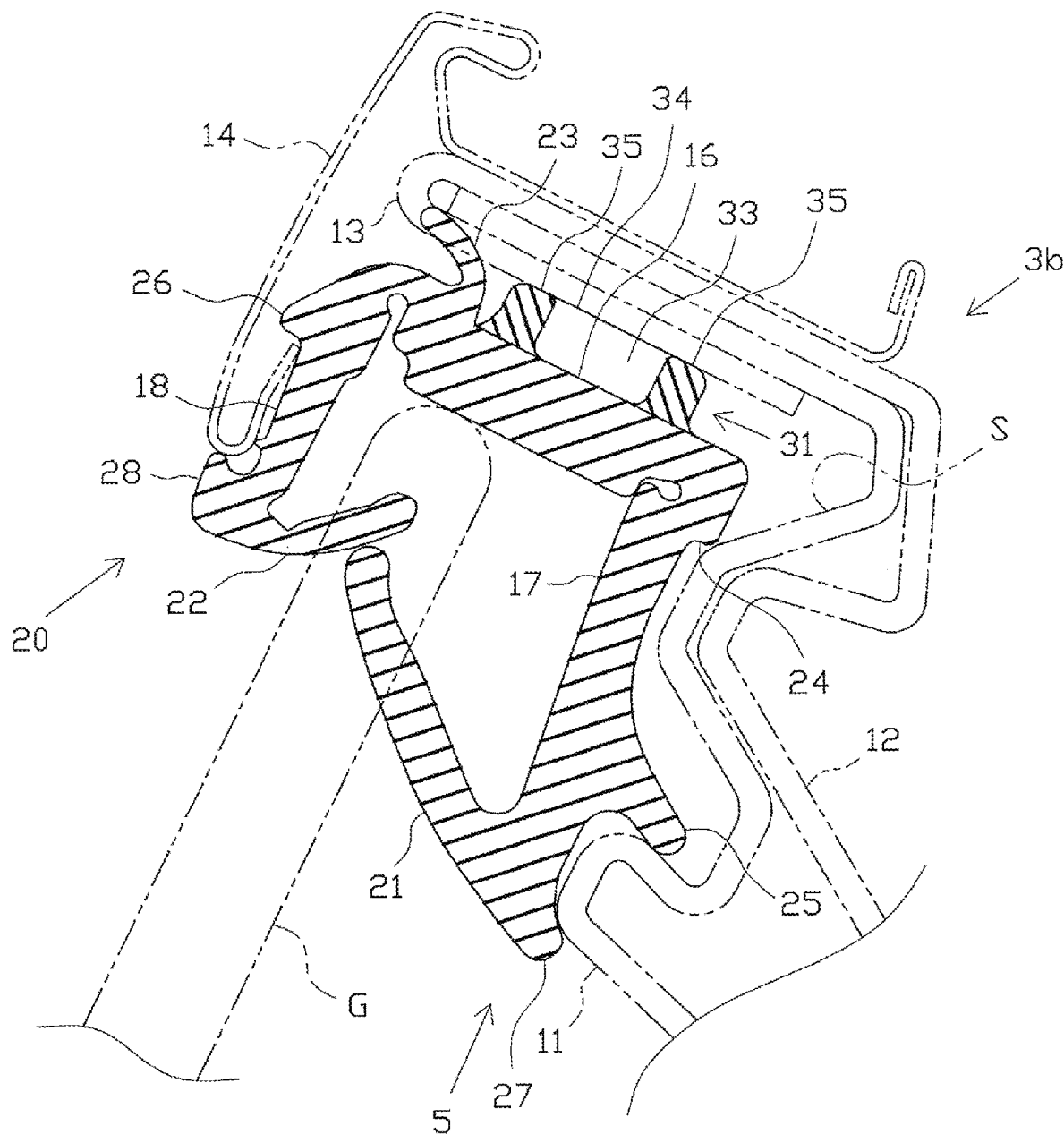
FIG. 3 is a cross-sectional view taken along the line J-J of FIG. 2 illustrating an upper side part of the glass run.

Next, the glass run 5 will be described in more detail based on the configuration of the upper side part of the glass run 5 mounted to the upper side part of the door frame 3b. FIG. 3 is a cross-sectional view taken along the line J-J of FIG. 2 illustrating the cross-sectional shape of the upper side part (connecting part 30 between the upper extrusion molding part 6 and the rear upper corner molded part 10) of the glass run 5.

As illustrated in FIG. 3, the upper side part of the door frame 3b includes an outer panel 11 and an inner panel 12 constituting a main body part of the door frame 3b, and a molding member 14 as an exterior member mounted to the panels 11 and 12.

Then, the molding member 14 is mounted and fixed to the flange part 13 formed by bending the end edge parts of the outer panel 11 and the inner panel 12 to the outside of the vehicle, respectively, and superimposing the both, and thus, the sash part S into which the upper side part of the glass run 5 is fitted is constituted.

On the other hand, the upper side part of the glass run 5 has a base part 16, a substantially U-shaped body part 20 when viewed in a cross section orthogonal to the longitudinal direction including vehicle inside sidewall part 17 extending from both ends of the base part 16 and a vehicle outside sidewall part 18, and a pair of seal lips 21 and 22 extending from the distal ends of the vehicle inside sidewall part 17 and the vehicle outside sidewall part 18 to the inside of the main body part 20, respectively.

When the door glass G is closed, the vehicle inside seal lip 21 is pressed against the inside surface of the door glass G, and the vehicle outside seal lip 22 of the is pressed against the outside surface of the door glass G, so that the inside of the glass G and the outside of the car are sealed, respectively.

Incidentally, the vehicle outside sidewall part 18 is formed to be relatively smaller as compared with the inside sidewall part 17, and accompanying thereto, the vehicle outside seal lip 22 is formed to be relatively smaller as compared with the vehicle inside seal lip 21. As a result, a so-called flash surface is formed.

Further, on the upper surface (outer circumferential side surface) of the base part 16, an auxiliary lip 23 formed so as to extend from the vicinity of the connection part with the vehicle outside sidewall part 18 toward the vehicle exterior is provided. In the mounted state of the glass run 5, the auxiliary lip 23 abuts or presses against the flange part 13 in an elastically deformed state. This prevents rainwater or the like from entering the vehicle inside via the gap between the glass run 5 and the sash part S.

On the inside surface of the inside sidewall part 17, a locking protrusion 24 protruding from the vicinity of the connecting part with the base part 16 toward the vehicle inside is provided, and a locking lip 25 formed to extend from the vicinity of the distal end portion toward the vehicle inside is provided. The locking protrusion 24 and the locking lip 25 are locked to predetermined portions of the outer panel 11 in the mounted state of the glass run 5.

A locking protrusion 26 protruding from the vicinity of the connecting part with the base part 16 toward the outside of the vehicle is provided on the vehicle outside surface of the vehicle outside sidewall part 18. The locking protrusion 26 is locked to a predetermined portion of the molding member 14 in the mounted state of the glass run 5.

On the distal end portion of the inside sidewall part 17, an inside cover lip 27 formed to extend toward the vehicle inside is provided, and at the distal end portion of the outside sidewall part 18, a vehicle exterior cover lip 28 is provided. The cover lips 27 and 28 are engaged with the inner circumferential side edge parts of the outer panel 11 and the molding member 14, respectively, when the glass run 5 is mounted.

With such a configuration, the main body part 20 of the glass run 5 is held in the sash part S.

Although illustration and detailed explanation are omitted, the vertical side parts before and after the glass run 5 also basically have the same cross-sectional shape as the upper side part, and the main body part 20, and the seal lips 21 and 22 and the like.

Figure 4:
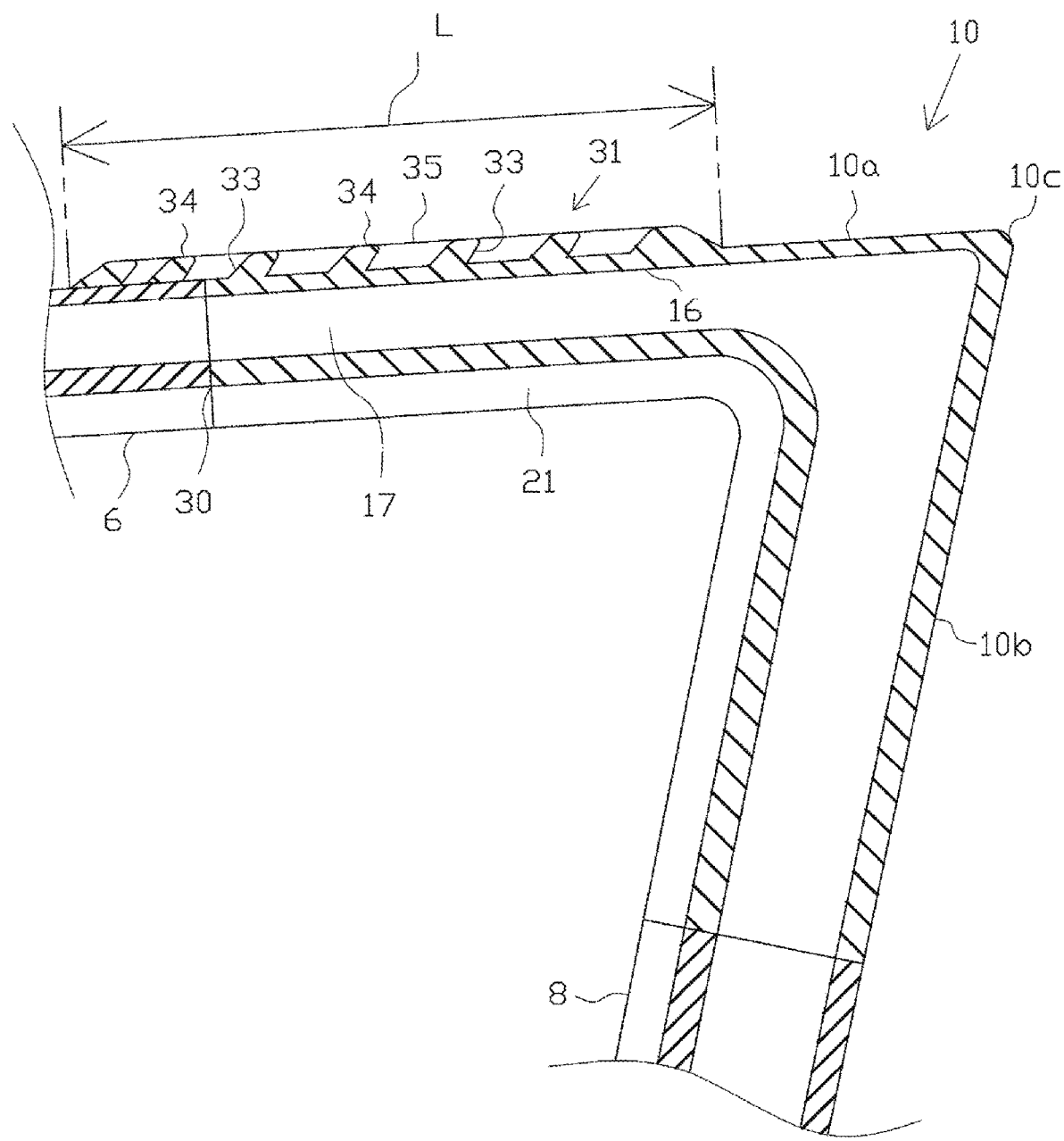
FIG. 4 is a partially enlarged cross-sectional view of the glass run illustrating a rear upper corner molded part and its circumferential portion.
Figure 5:
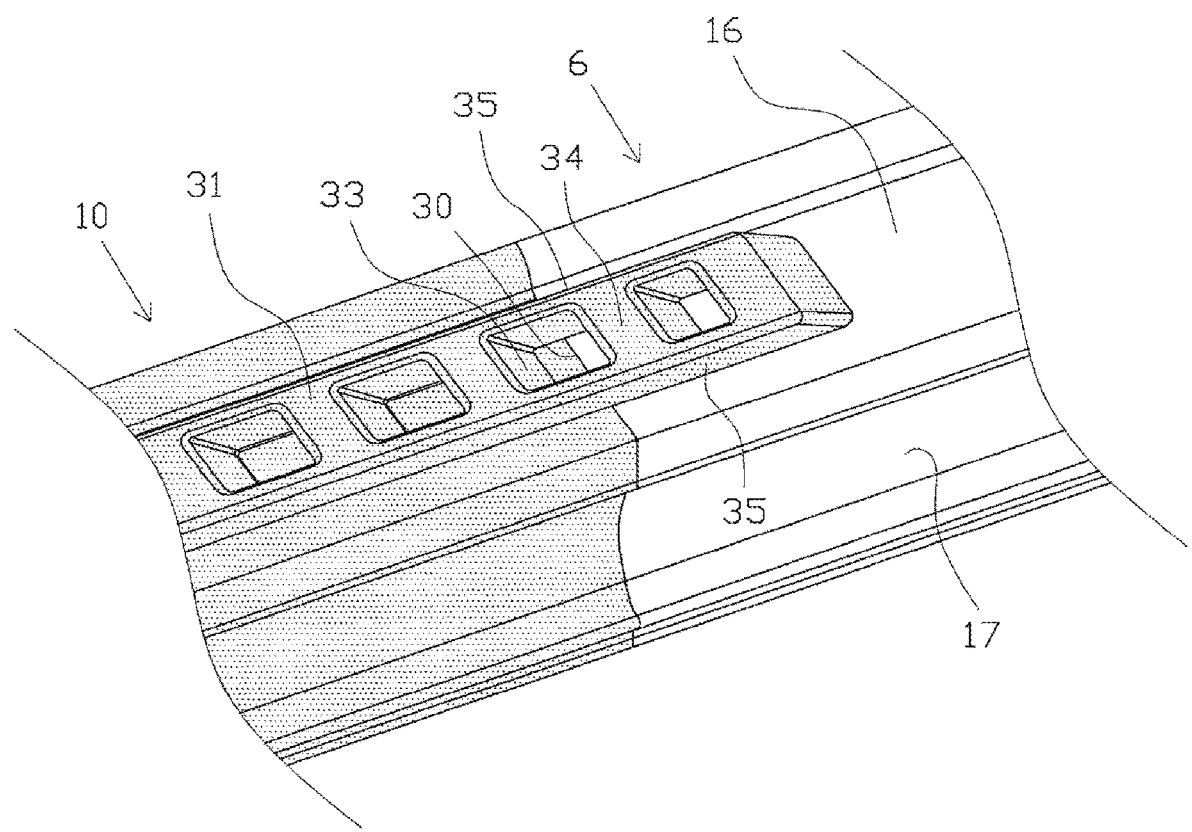
FIG. 5 is a partially enlarged perspective view of the glass run illustrating the vicinity of a connecting part between an upper extrusion molding part and the rear upper corner molded part.

Next, the configuration around the connecting part 30 between the upper extrusion molding part 6 and the rear upper corner molded part 10 will be described in detail with reference to FIGS. 3 to 5 and the like. FIG. 4 is a partially enlarged cross-sectional view of the glass run 5 illustrating the rear upper corner molded part 10 and its circumferential portion, and FIG. 5-s a partially enlarged perspective view of the glass run 5 illustrating the periphery of the connecting part 30 between the upper extrusion molded part 6 and the rear upper corner molded part 10. Incidentally, in FIG. 5, for the sake of convenience, a scattering pattern is mounted to a portion corresponding to the rear upper corner molded part 10.

As illustrated in FIG. 4, the rear upper corner molded part 10 has a configuration in which a molded part upper side part 10a extending on an extension line of the upper extrusion molding part 6 and a molded part vertical side part 10b extending on an extension line of the rear extrusion molding part 8 intersect with each other at an acute angle at the rear upper corner part 10c. That is, the upper extrusion molding part 6 and the upper mold part 10a constitute the upper side part of the glass run 5 in the vicinity of the rear upper corner part 10c.

At the upper side part of the glass run 5, a protruding piece part 31 protruding from the upper face of the base part 16 is formed in a predetermined longitudinal section L extending across the connecting part 30 between the upper extrusion molding part 6 and the rear upper corner molded part 10. The protruding piece part 31 is formed in an elongated shape along the longitudinal direction of the glass run 5. Then, in the mounted state of the glass run 5, the protruding piece part 31 is brought into a state of being substantially in contact with the flange part 13.

The protruding piece part 31 is formed integrally with the upper extrusion molding part 6 as a part of the rear upper corner molded part 10 also with respect to the portion overlapping the upper extrusion molding part 6.

A plurality of concave parts 33 is intermittently formed in the protruding piece part 31 in the longitudinal direction thereof. As a result, in the protruding piece part 31, a plurality of partition wall parts 34 partitioning the respective concave parts 33 is intermittently provided in the longitudinal direction, and a pair of connection wall parts 35 which connects both end portions in the width direction of the partition wall part 34 (the vehicle interior end portion and the vehicle exterior end portion) to each other in the longitudinal direction is provided. The connection wall part 35 is formed over the entire predetermined section L.

Each concave part 33 is formed from the upper surface of the protruding piece part 31 to the upper surface of the base part 16. Each of the concave parts 33 is formed in a substantially rectangular shape in a cross section substantially parallel to the base part 16. Specifically, each of the concave parts 33 is configured to be surrounded by two sides substantially parallel to the longitudinal direction of the protruding piece part 31 defined by the pair of connection wall parts 35, and two sides substantially parallel to the width direction of the protruding piece part 31 (base part 16) defined by the two partition wall parts 34 opposed to each other in the longitudinal direction of the protruding piece part 31. Therefore, by the partition wall part 34 and the connection wall part 35 surrounding each concave part 33, a circumferential wall part continuous in the sectional circumferential direction of the concave part 33 is formed.

Each concave part 33 and each partition wall part 34 are inclined in the longitudinal direction of the protruding piece part 31. More specifically, each concave part 33 is formed such that its upper side (opening portion side) is inclined toward the rear upper corner part 10c with respect to a direction substantially orthogonal to the upper surface of the base part 16. Similarly, the partition wall parts 34 are formed such that the upper side (the distal end side) thereof is inclined toward the rear upper corner part 10c side with respect to the direction substantially perpendicular to the upper surface of the base part 16.

One of the plurality of concave parts 33 (the second concave part 33 from the right in FIG. 5) has a bottom part being a predetermined area of the upper surface of the base part 16 including a part of the connecting part 30.

Next, the manufacturing method of the glass run 5 will be mainly described with reference to the process related to the rear upper corner molded part 10. In the present embodiment, the glass run 5 is formed in a state in which a pair of sidewall parts 17 and 18 are developed with respect to the base part 16, that is, in a state in which the both sidewall parts 17 and 18 are opened to the outside with the connecting part with the base part 16 as a base point.

Figure 6:
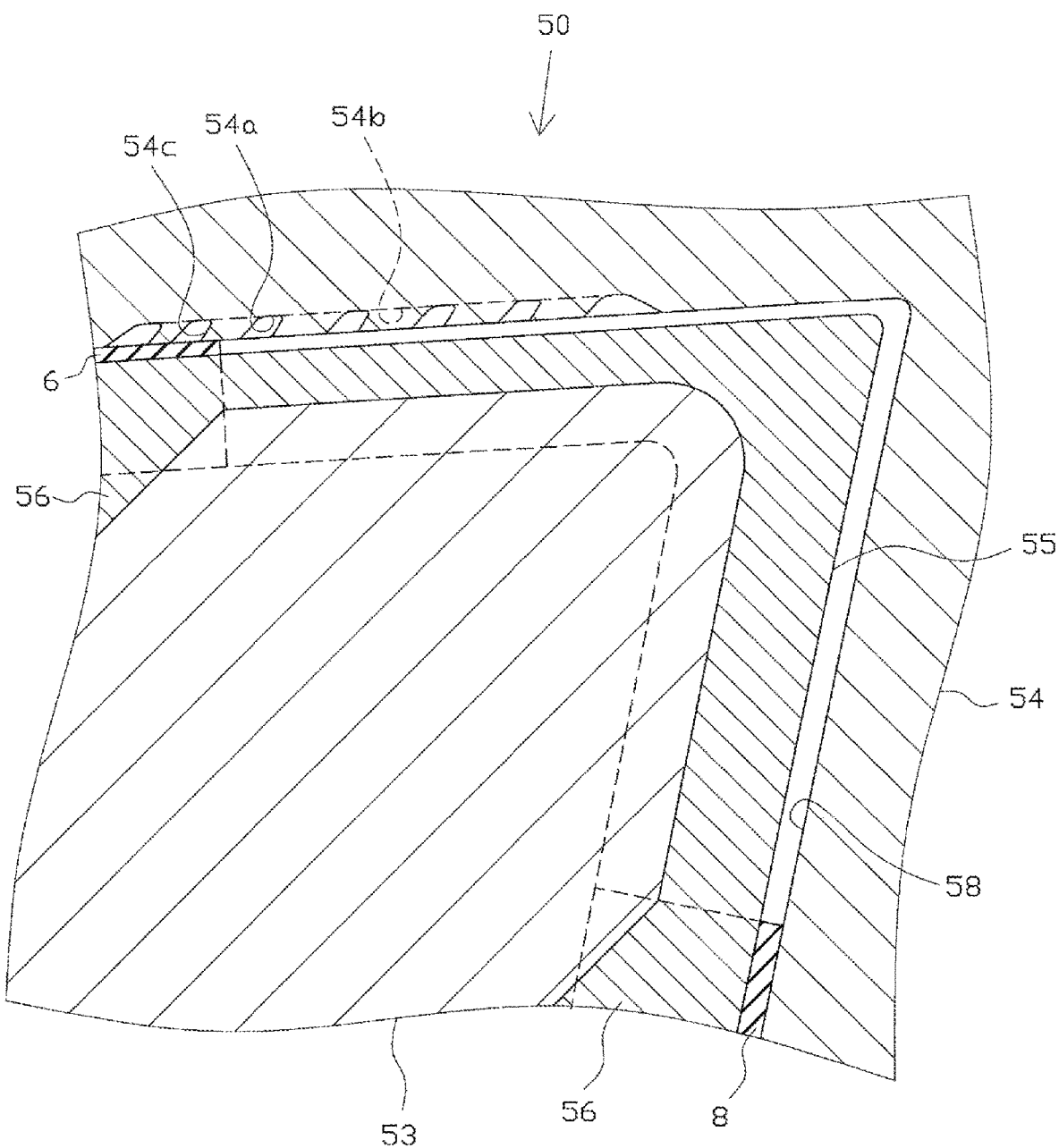
FIG. 6 is a cross-sectional view schematically illustrating a mold device for molding the rear upper corner molded part in a state where an extrusion molding part is fitted and clamped.

Here, the configuration of the mold device 50 for molding the rear upper corner molded part 10 will be described. As illustrated in FIG. 6, the mold device 50 includes an inner mold 53 that defines a sliding surface of the door glass G of the seal lips 21 and 22, an outer mold 54 that defines the outer circumferential side surface of the base part 16, and a core 55 that defines the main body part 20 and the inner circumferential side faces of the seal lips 21 and 22. Although it is not illustrated, the mold device 50 has a plurality of molds such as a lower mold defining the vehicle inside surface of the vehicle inside sidewall part 17 or an upper mold defining the vehicle outside surface of the vehicle outside sidewall part 18.

A cavity 58 for molding the rear upper corner molded part 10 is formed by the plurality of molds (an inner mold 53, an outer mold 54, a core 55, an upper mold, a lower mold, and the like). A support plate 56 for holding the core 55 at a predetermined position in the cavity 58 from outside extends to the core 55.

Figure 7:
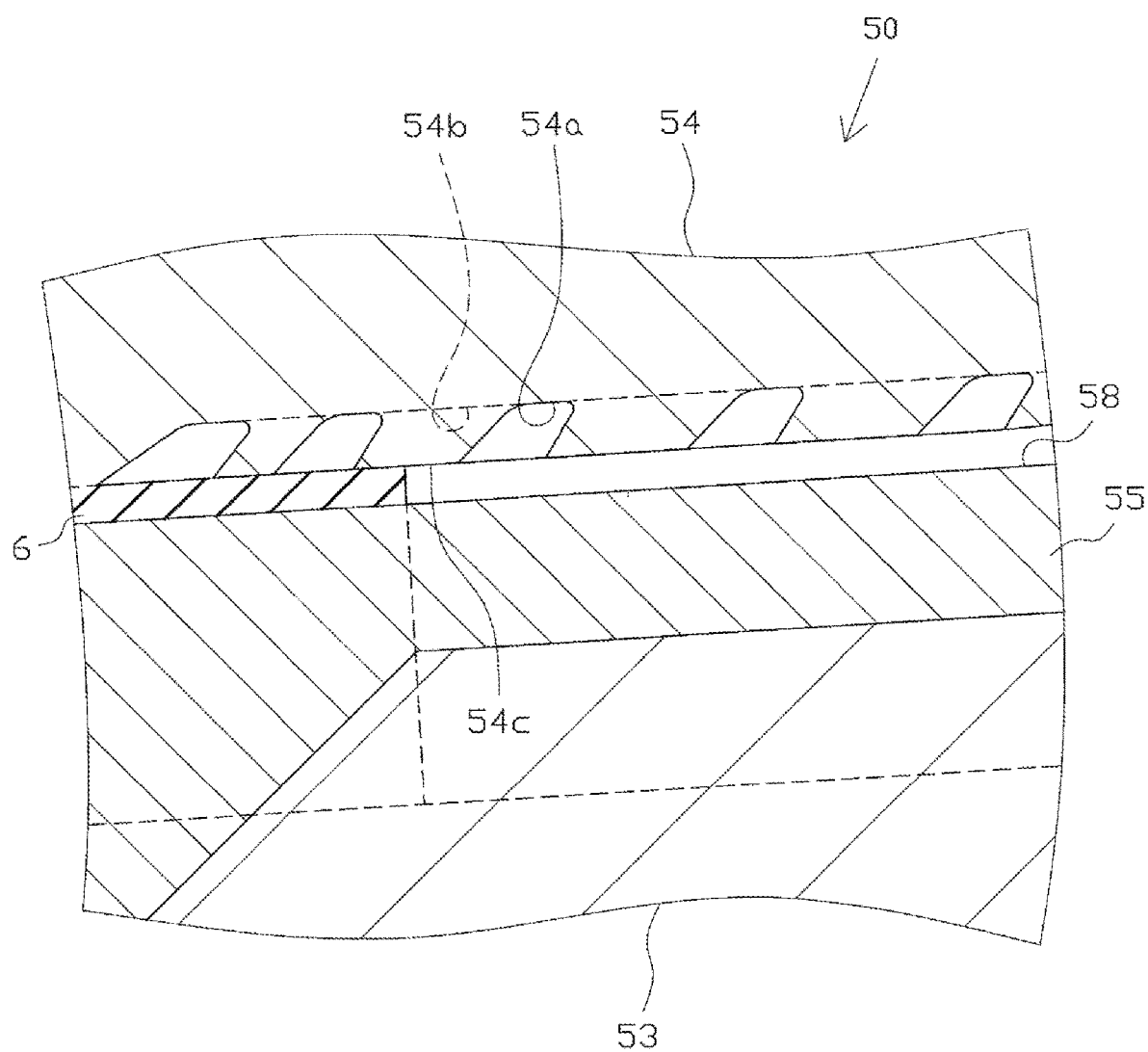
FIG. 7 is a partially enlarged cross-sectional view of the mold device describing a positional relation between the upper extrusion molding part fitted to the mold device and a convex molded part in a cavity.

Further, as illustrated in FIG. 7, concave molded parts 54a and 54b corresponding to the partition wall part 34 and the connection wall part 35 of the protruding piece part 31 are formed on the inner surface of the outer mold 54 facing the inside of the cavity 58, and a convex molded part 54c corresponding to the concave part 33 is formed.

With this configuration, in the extrusion molding process, extrusion molding parts 6 and 8 are formed by a known extrusion molding method, using an extrusion molding machine (not illustrated).

Thereafter, a setting process of fitting the extrusion molding parts 6 and 8 into the mold device 50 is performed. More specifically, in the state of opening the molds 53 and 54 and the like, the end portions of the extrusion molding parts 6 and 8 are fitted to both ends of the core 55 so as to be fitted to predetermined positions, and the extrusion molding parts 6 and 8 are mounted to the mold device 50.

Thereafter, the respective molds 53 and 54 and the like are arranged at predetermined positions, and the mold clamping is performed. At this stage, the cavities 58 are formed by the respective molds 53 and 54 and the like, and the core 55 is supported within the cavity 58.

When clamped in this manner, the extrusion molding parts 6 and 8 are positioned at the predetermined positions. At this time, with respect to the upper extrusion molding part 6, the upper surface side of the base part 16 at the end portion thereof is pressed by the convex molded part 54c (see FIG. 7).

Subsequently, a molding process related to the rear upper corner molded part 10 is performed. More specifically, an unvulcanized EPDM rubber as a die molding material is injected into the cavity 58 from a gate (not illustrated) provided in the vicinity of the corner part to fill it.

At this time, the unvulcanized EPDM rubber flows in the cavity 58 toward the extrusion molding parts 6 and 8, respectively. In particular, the concave molded part 54a corresponding to the partition wall part 34 of the protruding piece part 31 at the portion corresponding to the molded part upper side part 10a flows as follows.

The die molding material flowing from the cavity 58 corresponding to the base part 16 into the concave molded part 54a corresponding to the partition wall part 34 of the protruding piece part 31 first fills the back side of the concave molded part 54a along the upstream inclined wall surface (the right sidewall surface in FIG. 6) of the concave molded part 54a, and flows and fills the back side of the concave molded part 54b corresponding to the connection wall part 35. Subsequently, while filling the concave molded part 54a, the die molding material is filled in the concave molded part 54b, and follows the path back to the side of the cavity 58 corresponding to the base part 16 along the downstream side inclined wall surface (the left sidewall surface in FIG. 6) of the concave molded part 54a. On the other hand, the die molding material flowing into the concave molded part 54b flows into and fills the back side of the concave molded part 54a on the downstream side so as to go around the convex molded part 54c corresponding to the concave part 33.

In this way, after the EPDM rubber is filled in the entirety of the cavity 58, the EPDM rubber is vulcanized and solidified to form the rear upper corner molded part 10.

After the solidification is completed, the respective molds 53 and 54 and the like are opened and the rear upper corner molded part 10 is removed from the core 55. Accordingly, the glass run 5 in which the extrusion molding parts 6 and 8 are connected by the rear upper corner molded part 10 is obtained.

As described in detail above, according to the present embodiment, in the longitudinal predetermined section L straddling the connecting part 30 between the upper extrusion molding part 6 and the rear upper corner molded part 10 in the upper side part of the glass run 5, the protruding piece part 31 which projects from the upper surface of the base part 16 and is formed integrally with the rear upper corner molded part 10 is provided.

Therefore, it is possible to mitigate the impact at the time of contact of the door glass G, and to prevent various troubles such as occurrence of collision sound, interface cracking at the connecting part 30, deterioration of sealing property, and the like.

In addition, a plurality of concave parts 33 is intermittently formed in the protruding piece part 31 in the longitudinal direction thereof. This makes it possible to prevent the occurrence of sink marks or the like in the protruding piece part 31.

Figure 8:
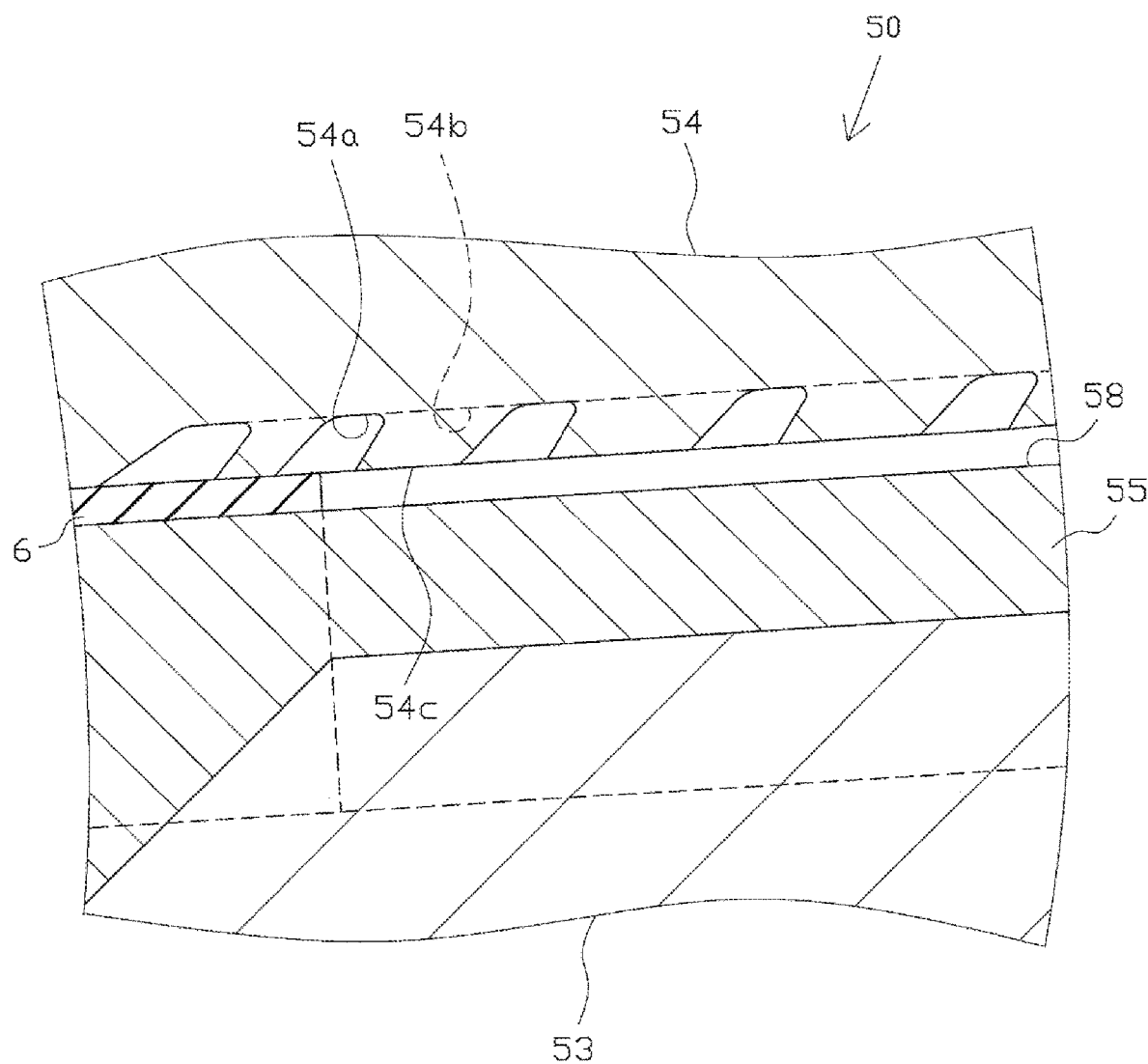
FIG. 8 is a partially enlarged cross-sectional view of a mold device illustrating a comparative example of a positional relation between an upper extrusion molding part fitted to the mold device and a convex molded part in a cavity.

However, in the case where the partition wall part 34 of the protruding piece part 31 is formed to be superimposed on the connecting part 30 between the upper extrusion molding part 6 and the rear upper corner molded part 10, as illustrated in FIG. 8, when the upper extrusion molding part 6 is set in the mold device 50 in performing the molding, the concave molded part 54a corresponding to the partition wall part 34 of the protruding piece part 31 is formed in the cavity 58 at the end portion of the upper extrusion molding part 6. That is, a part of the end portion of the upper extrusion molding part 6 is in a state of not being pressed by the mold device 50 (the convex molded part 54c or the like).

In such a case, due to the situation in which end portion of the upper extrusion molding part 6 is pushed by the pressure of the material injected into the cavity 58, a part of the end portion (connection part 30) of the upper extrusion molding part 6 may be distorted, and there is a fear that connection failure may occur due to curling or the like.

Further, as illustrated in FIG. 8, when the convex molded part 54c corresponding to the concave part 33 of the protruding piece part 31 is positioned on the upstream side of the end portion of the upper extrusion molding part 6 in the cavity 58, it is difficult for the material to wrap around to the end portion side of the upper extruded molded part 6, and the filling of the material tends to be insufficient. Therefore, even in such a case, connection failure may occur. As a result, there is a possibility of interface cracking or the like due to poor connection.

On the other hand, in this embodiment, as illustrated in FIG. 7, when the upper extrusion molding part 6 is set in the mold device 50 for performing the molding, the convex molded part 54c corresponding to the concave part 33 of the protruding piece part 31 is in the state of pressing the end portion of the upper extrusion molding part 6 in the cavity 58. As a result, it is possible to prevent the occurrence of connection problems, eventually occurrence of interface cracking and the like due to connection failure.

In addition, each of the concave parts 33 and each of the partition wall parts 34 in this embodiment are formed so that the upper side thereof is inclined toward the rear upper corner part 10c side. Correspondingly, the concave molded part 54a and the convex molded part 54c (the upstream sidewall surface and the downstream sidewall surface of the concave molded pail 54a and the convex molded part 54c) of the mold device 50 are also configured to be inclined with respect to the flow path direction of the die molding material which flows through the cavity 58 corresponding to the base part 16.

With such a configuration, the die molding material flowing from the cavity 58 corresponding to the base part 16 into the concave molded part 54a corresponding to the partition wall part 34 of the protruding piece part 31 flows into and fills the inner side of the concave molded part 54b corresponding to the connection wall part 35, while first filling the back side of the concave molded part 54a along the upstream side inclined wall surface of the concave molded part 54a. Subsequently, the die molding material is filled in the concave molded part 54b as it is filled in the concave molded part 54a and is guided along the downstream side inclined wall surface of the concave molded part 54a to the side of the cavity 58 corresponding to the base part 16.

On the other hand, the die molding material flowing into the concave molded part 54b flows into and fills the back side of the concave molded part 54a on the downstream side to go around the convex molded part 54c corresponding to the concave part 33. Therefore, at the time of molding, the inside of the concave molded part 54a corresponding to the partition wall part 34 of the protruding piece part 31 is easily filled with the die molding material. As a result, it is difficult for air or the like to remain on the back side of the concave molded part 54a, and molding failure is less likely to occur.

Furthermore, each concave part 33 in the present embodiment is configured to be surrounded by two sides that are substantially parallel to the longitudinal direction of the protruding piece part 31 defined by the pair of connection wall parts 35, and two sidewalls that is substantially parallel to the width direction of the protruding piece part 31 (base part 16) defined by the two partition wall parts 34 opposed to each other in the longitudinal direction of the protruding piece part 31, and is formed in a substantially rectangular shape in a cross section substantially parallel to the base part 16.

Correspondingly, the convex molded part 54c of the mold device 50 also has the same cross-sectional shape as the concave part 33. Therefore, even when the position of the end portion (connecting part 30) of the upper extrusion molding part 6 is deviated in the longitudinal direction due to the pressure of the material injected into the cavity 58 during molding, it is possible to constantly keep the pressing width of the end portion of the upper extrusion molding part 6 in the width direction of the protruding piece part 31 to be pressed by the convex molded part 54c.

It should be noted that the present invention is not limited to the description of the above embodiment, and may, for example, be implemented as follows. Of course, other application examples and modified examples which are not exemplified below are also possible.

(a) In the above embodiment, the present invention is applied to the glass run 5 mounted to the front door 3, but it may be applied to a glass run mounted to another door, such as a rear door.

For example, the protruding piece part 31 may be provided in a predetermined longitudinal section crossing the connecting part between an extrusion molding part disposed along the upper side pail of the rear door and a molded part disposed at the front upper corner part in which the upper side part and the front longitudinal side part of the rear door intersect with each other.

Also, with regard to the structure of the door frame to which the glass run 5 is mounted, a configuration different from that of the door frame 3b according to the above embodiment may be adopted.

(b) In the above embodiment, the extrusion molding parts 6 to 8 and the molded parts 9 and 10 are made of an EPDM rubber. Other rubber materials such as styrene butadiene rubber, butadiene rubber, chloroprene rubber and the like may be adopted as the material of the extrusion molding parts 6 to 8 and the molded parts 9 and 10. Alternatively, in addition to the rubber material, resin materials such as a soft resin olefinic thermoplastic elastomer (TPO), soft polyvinyl chloride (PVC), and dynamic crosslinking type olefinic thermoplastic elastomer (TPV) may be adopted.

In the above embodiment, the extrusion molding parts 6 to 8 and the molded parts 9 and 10 are formed of the same material. However, the present invention is not limited thereto, and the materials of the extrusion molding parts 6 to 8 and the molded part 9 and 10 may be different from each other. For example, the extrusion molding parts 6 to 8 may be formed of an EPDM rubber and the molded parts 9 and 10 may be formed of a TPO.

However, when the extrusion molding parts 6 to 8 and the molded parts 9 and 10 are formed of the same type of material, the connectivity between the extrusion molding parts 6 to 8 and the molded parts 9 and 10 is good. At the same time, a pulverization treatment can be performed, and products that are easy to recycle can be obtained.

(c) The configuration (cross-sectional shape etc.) of the glass run 5 is not limited to the above embodiment, and other configurations may be adopted.

(d) The configuration of the protruding piece part 31 is not limited to the above embodiment, and other configurations may be adopted. For example, a configuration in which at least one of the pair of connection wall parts 35 is omitted may be adopted. In this case, the concave part 33 has a cross-sectional shape (for example, a substantially U-shaped cross section) in which a part of the circumferential direction is cut out in a cross section substantially parallel to the base part 16.

(e) The configuration (shape, number, size, arrangement configuration, etc.) of the concave parts 33 is not limited to the above embodiment, and other configurations may be adopted.

For example, in the above embodiment, the plurality of concave parts 33 are formed in the protruding piece part 31, but the present invention is not limited thereto, and a configuration in which only one concave part 33 having a bottom part, which is a predetermined area of the upper surface of the base part 16 including a part of the connecting part 30, can be applied to the present invention.

In addition, each of the concave parts 33 according to the above embodiment is formed in a substantially rectangular shape in a cross section substantially parallel to the base part 16. The present invention is not limited thereto, and the cross-sectional shape may be different, such as a circular cross section.

Further, each of the concave parts 33 (each partition wall part 34) according to the above embodiment is formed such that its upper side is inclined toward the rear upper corner part 10c side. The present invention is not limited to this and it may be configured to be inclined in a different direction and may be formed along a direction substantially orthogonal to the upper surface of the base part 16 and not be inclined.

(f) The manufacturing method of the glass run 5 and the mold device 50 are not limited to the above embodiments, and other configurations may be adopted.

What is claimed is:

1. A glass run comprising:

an extrusion molding part, which is adapted to be located along an upper side part of the vehicle door; and a molded part connected and molded to the extrusion molding part by continuously die molding, wherein the molded part is located in a predetermined corner part, and the corner part is adapted to be located in the vicinity of where the upper side part and a vertical side part of the vehicle door intersect with each other, the extrusion molding part includes a main body part adapted to be mounted to a vehicle door including a door glass that ascends and descends, and the main body part has a substantially U-shaped cross section and includes:

a base part; and a vehicle inside sidewall part and a vehicle outside sidewall part, which extend from opposite ends of the base part, respectively, seal lips extend from the vehicle outside sidewall part and the vehicle inside sidewall part, respectively, to an inside of the main body part, and the seal lips are adapted to form a seal with the door glass;

the glass run includes a protruding piece part provided in a predetermined longitudinal section extending across a connecting part between the extrusion molding part and the molded part, the protruding piece part protrudes from an upper surface of the base part and is integral with the molded part;

a concave part is formed from an upper surface of the protruding piece part to the upper surface of the base part, and a bottom part of the concave part is a predetermined area of the upper surface of the base part and a part of the connecting part, the protruding piece part extends continuously from the molding part to the extrusion molding part, and the protruding piece part and the molded part are formed integrally of the same material.

2. The glass run according to claim 1, wherein the concave part is surrounded by a circumferential wall part continuous in a circumferential direction in a cross section substantially parallel to the base part.

3. The glass run according to claim 1, wherein an upper part of the concave part is inclined toward the corner part side of the molded part.

4. The glass run according to claim 1, wherein in the cross section substantially parallel to the base part, the concave part has a substantially rectangular cross section surrounded by two sides substantially parallel to a longitudinal direction of the protruding piece part and two sides substantially parallel to a width direction of the protruding piece part.

5. The glass run according to claim 1, wherein the protruding piece part includes a pair of connection wall parts, and the connection wall parts are parallel and extend continuously along opposite sides of the protruding piece part, and the connection wall parts extend in a longitudinal direction of the extrusion molding part and extend from the extrusion molding part to the molding part.

6. The glass run according to claim 5, wherein the concave part is one of a plurality of concave parts, and the plurality of concave parts is located between the connection wall parts.

* * * * *